United States Patent
Curley et al.

(10) Patent No.: US 8,565,413 B2
(45) Date of Patent: Oct. 22, 2013

(54) SOFTPHONE

(75) Inventors: Sean Curley, Golden, CO (US); David Grove, Thornton, CO (US); Mike Liliestedt, Centennial, CO (US); Jason Shugart, Denver, CO (US)

(73) Assignee: Alpine Access, Inc., Denver, CO (US)

( * ) Notice: Subject to any disclaimer, the term of this patent is extended or adjusted under 35 U.S.C. 154(b) by 1029 days.

(21) Appl. No.: 11/099,869

(22) Filed: Apr. 5, 2005

(65) Prior Publication Data

US 2006/0222168 A1   Oct. 5, 2006

(51) Int. Cl.
*H04M 3/42* (2006.01)
*H04M 3/00* (2006.01)

(52) U.S. Cl.
USPC ............................. 379/266.09; 379/265.04

(58) Field of Classification Search
USPC ................. 379/265, 265.01–265.06, 266.09
See application file for complete search history.

(56) References Cited

U.S. PATENT DOCUMENTS

| | | | |
|---|---|---|---|
| 5,073,890 A * | 12/1991 | Danielsen | 370/270 |
| 5,960,073 A | 9/1999 | Kikinis et al. | |
| 5,991,390 A | 11/1999 | Booton et al. | |
| 5,999,609 A | 12/1999 | Nishimura et al. | |
| 6,704,411 B1 * | 3/2004 | Nishidate | 379/265.09 |
| 7,804,948 B2 * | 9/2010 | Turner | 379/204.01 |
| 2001/0001610 A1 | 5/2001 | McElvaney et al. | |
| 2002/0196929 A1 * | 12/2002 | Smith et al. | 379/266.01 |
| 2003/0212558 A1 * | 11/2003 | Matula | 704/260 |
| 2004/0022383 A1 * | 2/2004 | Duncan et al. | 379/265.01 |
| 2004/0028212 A1 * | 2/2004 | Lok et al. | 379/265.09 |
| 2004/0141508 A1 | 7/2004 | Schoeneberger et al. | |
| 2005/0190721 A1 * | 9/2005 | Pershan | 370/328 |
| 2006/0062373 A1 * | 3/2006 | Chervets et al. | 379/265.03 |

OTHER PUBLICATIONS

International Search Report dated Aug. 23, 2007.

* cited by examiner

*Primary Examiner* — Quynh Nguyen
*Assistant Examiner* — Oleg Asanbayev
(74) *Attorney, Agent, or Firm* — Dorsey & Whitney LLP

(57) ABSTRACT

A remote agent call center is functional by providing a softphone and agent bridge that allows maintaining an open telephone line to the agent's phone with or without an incoming call being connected. Incoming calls are merged into the agent bridge to allow the agent to conference with the incoming call. The softphone provides call control to allow the agent to transfer, terminate, hold, record, or the like the active call.

12 Claims, 5 Drawing Sheets

SOFTPHONE

FIELD OF THE INVENTION

The present invention relates to remotely or virtually operated call centers.

BACKGROUND OF THE INVENTION

There is a growing trend in the call center industry to support virtual or remote agents. The benefits of virtual or remote agents include the ability to attract higher quality operators, reduced operating and facility costs, access to more potential operators as the operator is no longer tied to a geographic location, better disaster recovery and system redundancy, and the like. The benefits of remote access are being implemented in many large entities for more than call center operation. For example, the Federal Government and many state governments have introduced legislation to encourage telecommuting and in some cases have changed policy to require a certain percent of employees to telecommute.

The trends towards more remote access will likely increase in the coming years with pressures to bring services back to the United States and pressures from increasing fuel prices and the like. Unfortunately, existing infrastructure in the field is inadequate to support the increase in remote access. For example, the infrastructure for remote or virtual call center operations is inefficient, of limited scalability, and costly.

Thus it would be advantageous to develop an improved infrastructure to support remote access.

SUMMARY OF THE INVENTION

To attain the advantages and in accordance with an aspect of the present invention a remote agent call center is provided. The remote agent call center includes a softphone, a telephony switch, an agent telephone, an IVR, and an agent bridge. The agent workstation is connected to the softphone, typically via an Internet connection. The softphone is connected to the telephony switch and the agent bridge. The agent telephone is also connected to the agent bridge. The agent bridge is connected to the switch as well. The IVR receives an initial call from the agent and transfers the agent telephone to the agent bridge, such that when an incoming call is received at the telephony switch, the telephony switch can connect the incoming call to the agent using the agent bridge and when the incoming call is disconnected, the connection to the agent telephone is maintained.

The foregoing and other features, utilities and advantages of the invention will be apparent from the following more particular description of a preferred embodiment of the invention as illustrated in the accompanying drawings.

BRIEF DESCRIPTION OF THE DRAWING

The accompanying drawings, which are incorporated in and constitute a part of this specification, illustrate embodiments of the present invention, and together with the description, serve to explain the principles thereof. Like items in the drawings may be referred to using the same numerical reference.

DETAILED DESCRIPTION

An embodiment of the present invention will now be described with reference to FIGS. 1-5. While the present invention is described with particular reference to conventional telephony protocols in a virtual or remote call center setting, one of ordinary skill in the art will recognize the present invention would be useful with other protocols, such as, for example, Voice Over Internet Protocol (VoIP), and in other remote access systems, such as, for example, telecommuting, or the like.

If one looked to how traditional call centers operate, one could develop a set of rules that define the operation of well run call centers. The business rules include, for example, that the agent operate in a relatively noise fee environment such that the customer receives high call quality. The rules also suggest that customer calls should be answered quickly, efficiently, and reliably by a smart and friendly agent. Furthermore, the agent must have the ability to resolve the subject matter of the call and/or be capable of transferring the customer to a supervisor or someone who can resolve the subject matter.

To achieve these rules, the present invention was developed with the several principles in mind, which include, but are not limited to, the following. First, the system must connect the agent such that the agent can quickly and efficiently take calls. In other words, the system must be set up such that the agent's telephone does not "ring" every time the system transfers a customer to the agent. Second, the system must be arranged such that another person in the agent's vicinity cannot accidentally answer the call from a customer. Third, the agent must be able to acknowledge an incoming customer call to avoid a call being delivered to an unavailable agent. Fourth, if the first selected agent is unavailable, the customer must be seamlessly forwarded to another agent. Fifth, the system must deliver the call in a timely manner. As a rule of thumb, the system was designed to deliver a customer call within about 2 to 15 seconds and more preferably about 7 seconds; therefore, the call line should be established prior to needing to deliver a call. While the above are some of the primary reasons for the present invention, the present invention also was designed to allow easy scalability so it was designed without the need for special equipment at the agent's workstation. Moreover, the system was designed to use conventional interconnectivity, such as, for example, common Internet connections, telephony connections, and the like.

Figure 1:
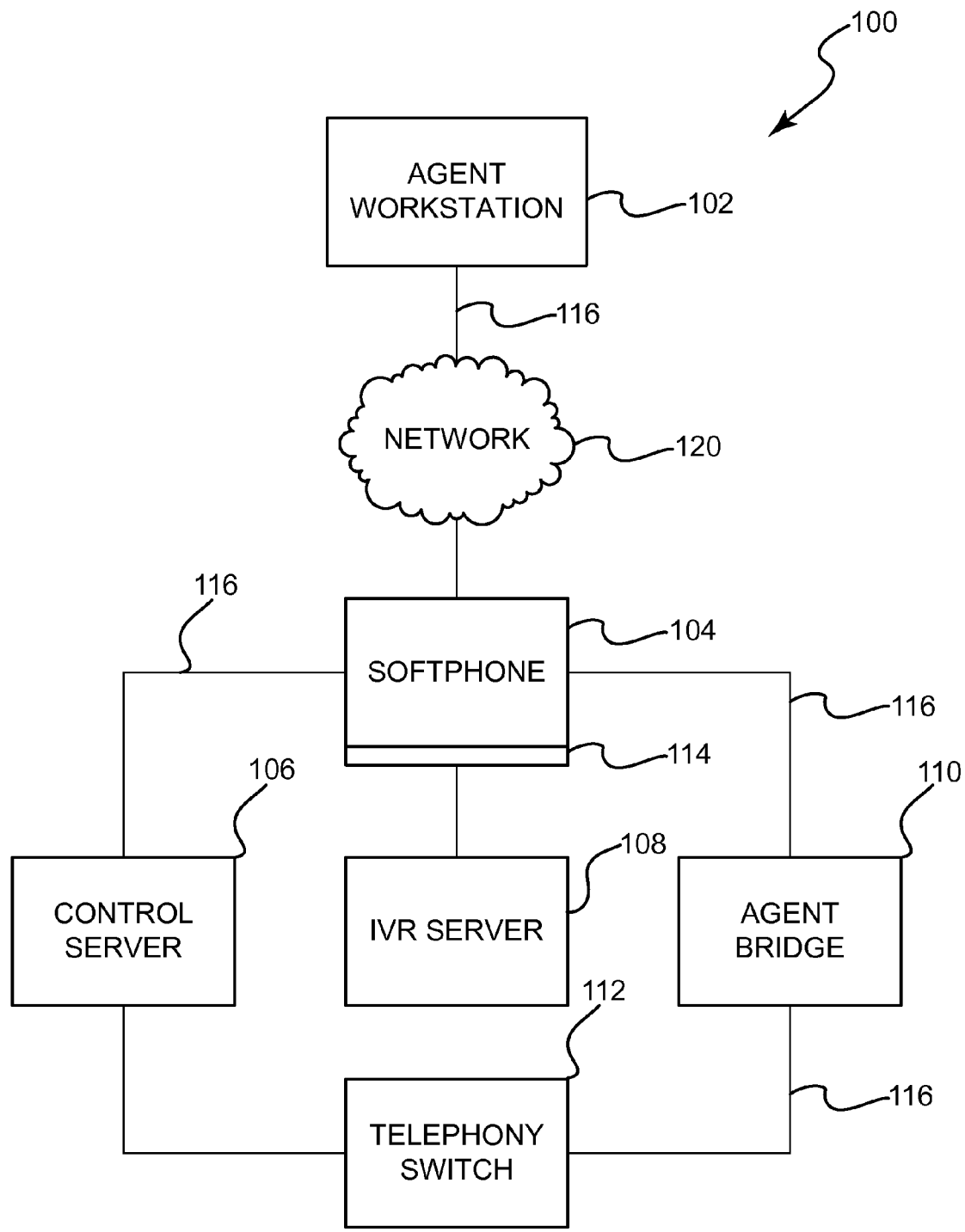
FIG. 1 is a functional block diagram of a portion of a remote agent call center consistent with an embodiment of the present invention.

Referring now to FIG. 1, a basic system for remote agent call center 100 ("RACC") is shown. RACC 100 includes an agent workstation 102, a softphone 104, a control server 106, an interactive voice response ("IVR") server 108, an agent bridge 110, and a telephony switch 112. Softphone 104 may require an IVR interface 114. The agent workstation 102 could be a proprietary workstation, but conventional processors work well. For example, workstation 102 could be a desktop computer, a laptop computer, a server, a mainframe, a blade, or other processing device. The agent connects to softphone 104 through the agent workstation 102 over a network connection 120. Network 120 could be any type of network, such as, for example, a LAN, WAN, WLAN, WiFi, Ethernet, Internet, or the like. If using the Internet, workstation 102 could connect to softphone 104 using conventional browsers, such as, for example, MICROSOFT EXPLORER®. The softphone 104 communicates with the other systems to provide the overall call control and system functionality. The agent bridge 110 acts like a phone in a traditional call center and allows the remote agent to mimic a physical presence in a traditional call center. The control server 106 is used for call control with the telephony switch 112. Telephony switch 112 could be a number of conventional switches such as, for example, an AVAYA G3R® switch. Thus, for example, using the AVAYA G3R® switch, control server 106 provides interaction between the softphone 104 and the proprietary protocols of the AVAYA G3R® switch. The IVR server 108 is used to connect or dial into the agent bridge 110. While shown as separate units for convenience, it would be possible to combine parts of RACC 100. Moreover, the term server should be construed broadly and includes, for example, desktop computers, laptop computers, traditional servers, blades, PDAs, mainframe computers, and the like. Further, each of the parts of RACC 100 are shown connected by communication links 116. Communication links 116 may be one or more conventional communication links including, for example, cables, fibers, wireless connections, LANs, WANs, WLANs, WiFi, ribbon cables, buses, the Internet, or the like.

Figure 2:
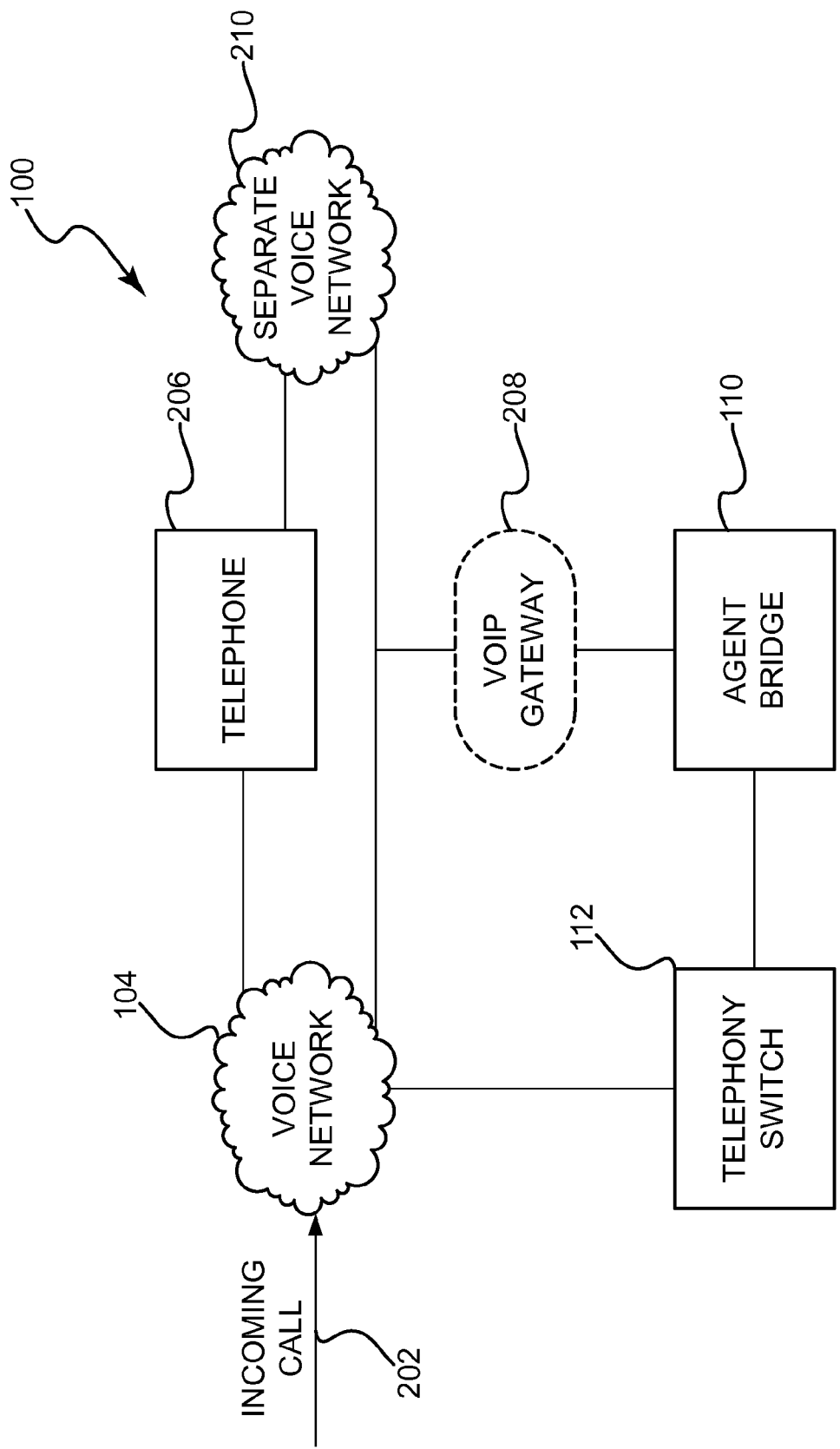
FIG. 2 is a functional block diagram of a portion of a remote agent call center consistent with an embodiment of the present invention.

FIG. 2 shows the incoming call connection for RACC 100. Incoming call 202 generally originates from the telephone system (which is typically a PSTN system, but could be other protocols) shown generically as a voice network 204. The incoming call is routed to telephony switch 112 that connects incoming call 202 to agent bridge 110. Agent bridge connects the incoming call 202 to a telephone 206 of the remote agent, typically through the same voice network 204. If a VoIP network is used, agent bridge 110 may route the incoming call 202 through a VoIP gateway 208 (shown in phantom) to the telephone 206. Agent bridge 110 could route incoming call 202 over a separate voice network 210 that may or may not use the same protocols as voice network 204, which may require some protocol conversions.

Figure 3:
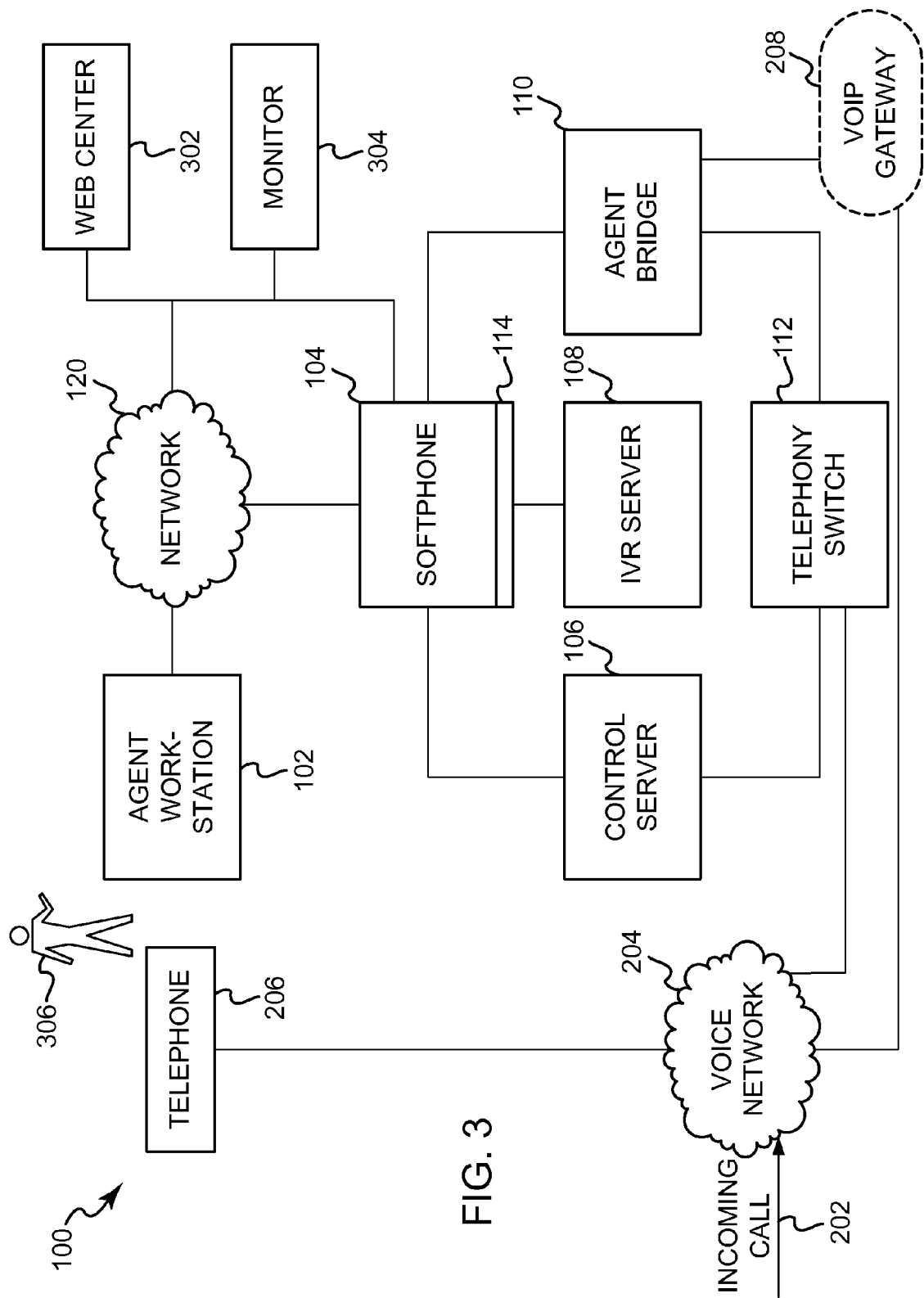
FIG. 3 is a functional block diagram of FIG. 1 and FIG. 2 combined.

Referring to FIG. 3, RACC 100 is shown in more detail. As explained above, RACC 100 includes agent workstation 102, connected to softpone 104, call control service 106, IVR server 108, which in Figure three includes agent bridge 110, and telephony switch 112. Telephony switch 112 is connected to voice network 204 to receive incoming call 202, and telephone 206. Moreover, a protocol converter, such as VoIP gateway 208 may be used. A web center 302 and real time monitor 304 may be connected as well as is explained further below.

Figure 4:
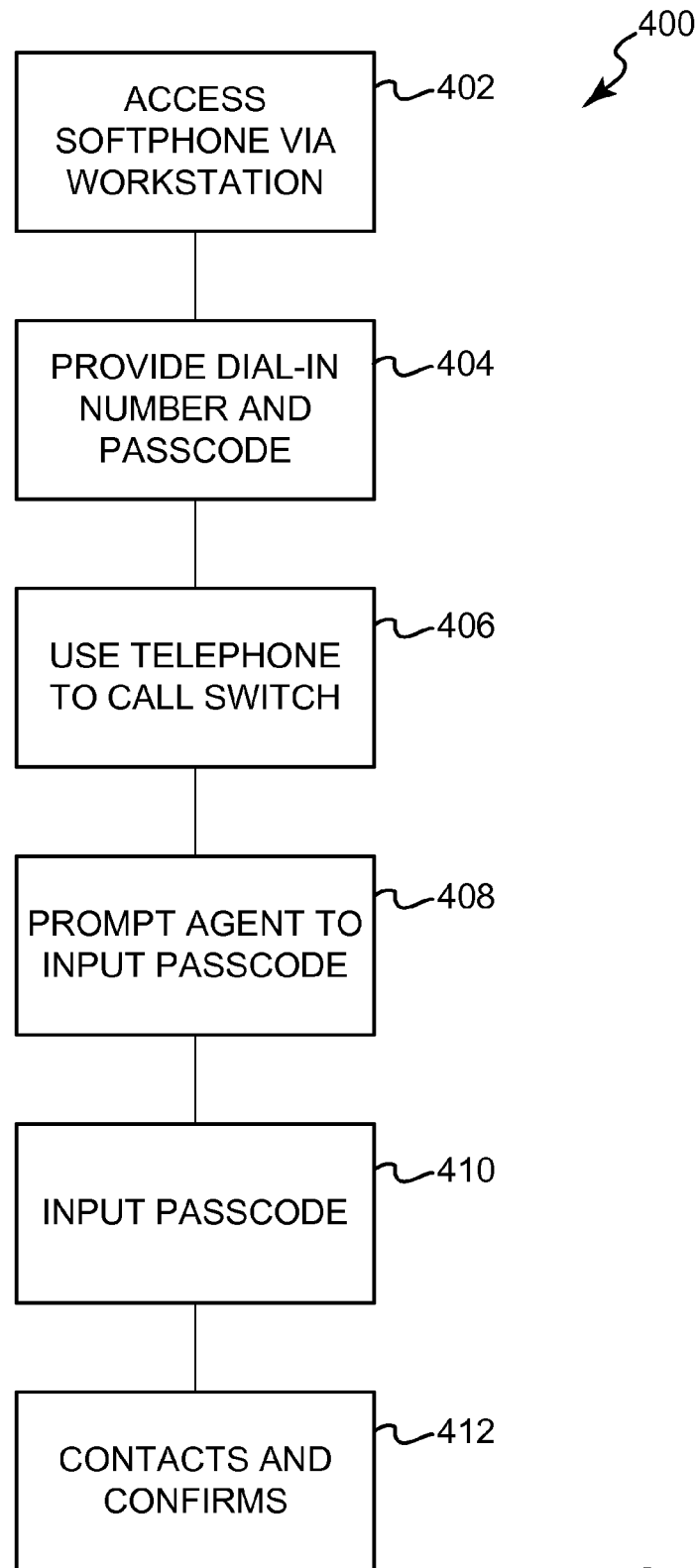
FIG. 4 is a flowchart illustrative of a method of logging into the system of FIG. 3.

Agent 306 logs into system 100 as will be described with reference to FIG. 4 and flowchart 400. First, agent 306 at workstation 102 logs into telephony switch 112 by first accessing softphone 104 via workstation 102, step 402. Accessing softphone 104 may include security provisions, such as, a login procedure, a security module installed at workstation 102 that softphone 104 recognizes, or the like. Next, softphone 104 provides a phone number to call and pass-code to the agent, step 404. The call in number and pass-code could be pre-assigned or provided randomly and dynamically by softphone 104. The remote agent dials the call in number on the telephone 206 and is connected to IVR server 108, step 406. IVR server 108 prompts the remote agent 306 to dial the pass-code, step 408. The agent inputs the pass-code, step 410. On receipt of the pass-code, IVR server 108 contacts softphone 104 to verify the pass-code for the particular call in number, step 412. On confirmation, IVR server 108 transfers the agent telephone connection to agent bridge 110. Alternatively, softphone 104 could supply the pass-code to IVR server 108 prior to the remote agent dialing in. Once validated, IVR server 108 connects telephone 206 to agent bridge 110. If the pass-code is invalidated, IVR server 108 could disconnect telephone 206, prompt agent 306 to redial the pass-code, prompt agent 306 to confirm the call in number, some combination thereof, or the like.

As mentioned above, agent bridge 110, which is similar to a conference bridge, allows the system to simulate remote agent 306 being physically located in a traditional call center by providing a continuous, open telephone line to telephone 206. A control connection 308 maintained between telephone switch 112 and agent bridge 110 is provided for individual call controls, as will be explained further below. The agent bridge 110 allows telephony switch 112 to merge incoming calls 202 such that telephone 206 can be connected to new incoming calls. Agent 306 would be alerted to a new call by a tone from agent bridge 110 delivered to telephone 206 over the continuous, open telephone line to telephone 206. Agent bridge 110 also provides mechanisms to merge a recording device 308 to the call when incoming call 202 is merged to provide call recording capability and quality control.

The control server 106 connects to the telephony switch 112. Some telephony switches, such as the Avaya switch, use proprietary controls. In those instances, the control server 106 may require libraries and the like to use a proprietary protocol to perform call control and switch functions, such as, for example, calls in queue, completed calls, agent state changes, and the like). Control server 106 may be integrated into the softphone 104 as desired. The control server 106 largely passes commands and events between softphone 104, agent bridge 110, and telephony switch 112. Control server 106 may perform some processing of the commands and events, such as, for example, protocol conversions and the like.

Web center 302 provides a portal for access to systems and applications necessary for the remote agent 306 to access via workstation 102. Web center 302 may, for example, provide authentication of the remote agent's login, provide tools for the agent to launch various programs, such as the softphone connection, and access to customer specific information. Real time monitor 304 takes events from other applications, applies various rules, and provides data. Generally the real time monitor 304 monitors call distribution, tracks agents to manage agent productivity and use, and provides error information. The web center 302 and real time monitor 304 are described herein for completeness, but are generally known in the art and only described in relation to the softphone architecture.

If necessary, softphone 104 includes IVR interface 114. IVR interface 114 allows softphone 104 to interface with IVR server 108 and telephony switch 112 as necessary by converting the softphone data transfer protocols. IVR interface 114 may control various processes as well.

Figure 5:
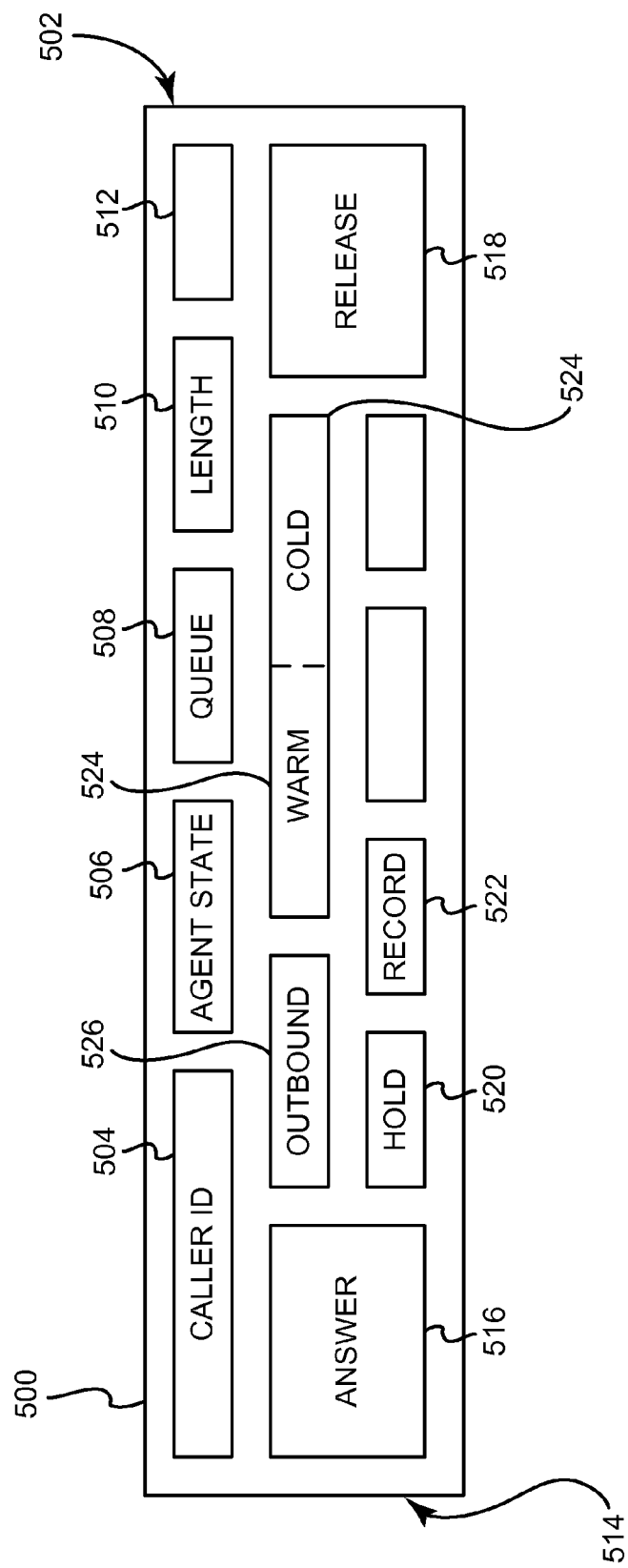
FIG. 5 is a graphical user interface consistent with an embodiment of the present invention.

Softphone 104 provides message-passing middleware. It receives messages from the other components of RACC 100 and disburses tasks, additional requests, or provides data in response to the messages. It is envisioned that Softphone 104 would accept standard communication protocols, such as, for example, TCP, UDP, and the like. FIG. 5 represents a possible user interface 500 residing on a display associated with workstation 102. User interface 500 provides information for the agent, but also information that can be monitored by real time monitor 304. For example, interface 500 includes a plurality of fields 502 and a plurality of tool buttons 514. Fields 502 may include, for example, a caller ID field 504, an agent state field 506, an in queue field 508, and a call length timer 510. Field 512 represents that other, more, or less fields are possible. Tool buttons 514 may include conventional call control buttons, such as, for example, an answer call button 516, a release call button 518, a hold call button 520, a record call button 522, a transfer call button 524 (which could be multiple buttons as shown—with warm transfer being where the transferring party speaks to the transferred to party prior to transfer and a cold transfer being a transfer without the transferring party speaking to the transferred to party prior to transfer), and a dial outbound call button 526. These conventional call controls are supplied by softphone 104 to telephony switch 112 and agent bridge 110 to provide conventional call control for incoming call 202. Because the control tool buttons 514 provide conventional controls, although controlled via the softphone interface instead of traditional IVR or touch tone control, it will not be explained further herein. The field 520 provide information useful for the back office. For example, caller ID field 504 provides an indication of what number the caller called. Agent state field 506 provides an indication of the state of an agent, such as, Available, Busy/On Call, Break, After Call Wrap, and the like. The in queue field 510 could provide an indication of whether this group of agents has calls lined up. Call length field 512 could provide an indication of the time the agent has been on the current call. Other, more, or less fields are possible.

While the invention has been particularly shown and described with reference to an embodiment thereof, it will be understood by those skilled in the art that various other changes in the form and details may be made without departing from the spirit and scope of the invention.

We claim:

1. A system configured to establish a connection between a remote agent call center and a remote agent, where the remote agent initiates from a telephone a first contact with the remote agent call center and the first contact directly establishes a persistent voice connection, the system comprising:
    an agent workstation;
    a softphone;
    a telephony switch;
    an Interactive Voice Response (IVR) server connected to the softphone;
    an interactive voice response interface connected between the softphone and the IVR server;
    a web portal that allows the remote agent at the agent workstation to access client applications;
    an agent telephone;
    an agent bridge,
    a softphone graphical user interface displayed at the agent workstation allowing the remote agent at the agent workstation to provide a group of controls consisting of: answering a call, terminating a call, holding a call, recording a call, and transferring a call; wherein
    the softphone, the telephony switch, the IVR server, and the agent bridge are included in a remote agent call center;
    the agent telephone is connected to the agent bridge through a telephone connection;
    the agent workstation initiates, from the agent telephone, the first contact with the remote agent call center to establish the persistent voice connection;
    the agent workstation first initiates a first connection to the softphone;
    the softphone provides a phone number and pass-code randomly and dynamically to the remote agent;
    the remote agent dials the phone number and is connected to the IVR server;
    the IVR server prompts the remote agent to dial the passcode;
    the IVR server contacts the softphone to verify the passcode for the phone number dialed by the remote agent;
    the first contact directly establishes the persistent voice connection;
    the persistent voice connection is established between the agent bridge and the agent telephone;
    the softphone is connected to the telephony switch;
    the agent bridge is connected to the softphone, the telephony switch, and the agent telephone, such that the IVR server transfers the agent telephone to the agent bridge, such that when an incoming call is received at the telephony switch, the telephony switch can connect the incoming call to the agent using the agent bridge and when the incoming call is disconnected, the persistent voice connection between the agent telephone and the agent bridge is maintained;
    the agent bridge and the telephony switch are connected by a network other than a public switched telephone network; and
    the agent telephone is a voice over internet protocol phone and the connection between the agent telephone and the telephone switch comprises a voice over internet protocol gateway.

2. The system of claim 1, wherein a workstation and the softphone are connected through a network connection.

3. The system of claim 1, wherein the softphone is integrated in the workstation.

4. The system of claim 1, further comprising a control server.

5. The system of claim 1, further comprising a real time monitor.

6. The system of claim 1, wherein the softphone is connected to the telephony switch through an Internet connection.

7. A method of providing remote agents where a remote agent uses a telephone to initiate a first contact with a remote agent call center and the first contact directly establishes a persistent voice connection, the method performed in part on a processor comprising the steps of:
    receiving a request, from an agent telephone, to establish the persistent voice connection between an agent bridge of the remote agent call center and the agent telephone;
    in response to the request, providing a phone number and a passcode randomly and dynamically from a softphone to a workstation of the remote agent;
    connecting the agent telephone to an interactive voice response (IVR) server;
    prompting, by the IVR server, entry of the pass-code;
    contacting, by the IVR server, the softphone to verify the pass-code for the provided phone number;
    displaying a softphone graphical user interface to the remote agent, the softphone graphical user interface allowing the remote agent at the agent workstation to provide call controls consisting of: answering a call, terminating a call, holding a call, recording a call, and transferring a call;
    permitting access to client applications through a web portal;
    establishing and maintaining the persistent voice connection between the agent bridge of the remote agent call center and the agent telephone by the remote agent call center, wherein the persistent voice connection is initiated from the agent telephone;

transferring an incoming call to the telephony switch to connect the agent telephone and the incoming call to establish an active call;

controlling the active call;

disconnecting the active call when the active call is disposed such that the persistent voice connecting between the agent bridge and the agent telephone is maintained; and repeating the transferring, controlling, and disconnecting steps until the persistent voice connection is terminated; wherein the agent bridge and the telephony switch are connected by a network other than a public switched telephone network;

the agent telephone is a voice over internet protocol phone and the call between the agent telephone and the telephone switch comprises a voice over internet protocol gateway;

an interactive voice response interface is connected between the softphone and the IVR server; and the agent telephone is connected to the agent bridge through a telephone connection.

8. The method of claim 7, further comprising the step of recording the active call.

9. The method of claim 7, further comprising the step of transferring the incoming call to another persistent voice connection with another agent and maintaining the persistent voice connection with the agent.

10. The method of claim 7, further comprising the step of indicating an agent state.

11. The method of claim 7, wherein the transferring step includes establishing a 3-way voice communication link prior to completing the transfer to another agent.

12. The method of claim 7, wherein the workstation and the softphone are connected by an Internet connection.

* * * * *